United States Patent
He et al.

(10) Patent No.: US 10,678,374 B2
(45) Date of Patent: Jun. 9, 2020

(54) ELECTRICAL DEVICE, RECEIVING CIRCUIT, AND METHOD FOR TOUCH SENSING

(71) Applicant: HIMAX TECHNOLOGIES LIMITED, Tainan (TW)

(72) Inventors: Jia-Ming He, Tainan (TW); Yaw-Guang Chang, Tainan (TW); Wei-Song Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 369 days.

(21) Appl. No.: 15/705,254

(22) Filed: Sep. 14, 2017

(65) Prior Publication Data

US 2019/0079632 A1  Mar. 14, 2019

(51) Int. Cl.
*G06F 3/041* (2006.01)
*G06F 3/044* (2006.01)
*G06F 3/038* (2013.01)
*G06F 3/0354* (2013.01)

(52) U.S. Cl.
CPC .......... *G06F 3/0418* (2013.01); *G06F 3/0383* (2013.01); *G06F 3/03545* (2013.01); *G06F 3/044* (2013.01); *G06F 3/0442* (2019.05); *G06F 3/04166* (2019.05); *G06F 3/04182* (2019.05); *G06F 2203/04104* (2013.01); *G06F 2203/04114* (2019.05)

(58) Field of Classification Search
CPC .. G06F 3/0418; G06F 3/03545; G06F 3/0383; G06F 3/044; G06F 2203/04104
See application file for complete search history.

(56) References Cited

U.S. PATENT DOCUMENTS

| 9,013,429 | B1* | 4/2015 | Krekhovetskyy ... G06F 3/03545 345/173 |
|---|---|---|---|
| 2010/0026527 | A1 | 2/2010 | Nishimura et al. |
| 2013/0033450 | A1* | 2/2013 | Coulson .................. G06F 3/044 345/174 |

(Continued)

FOREIGN PATENT DOCUMENTS

| TW | 201519017 A | 5/2015 |
|---|---|---|
| TW | 201614455 A | 4/2016 |
| TW | 201727451 A | 8/2017 |

*Primary Examiner* — Temesghen Ghebretinsae
*Assistant Examiner* — Paras D Karki
(74) *Attorney, Agent, or Firm* — CKC & Partners Co., LLC

(57) ABSTRACT

An electrical device is provided and includes a touch electrode and a receiving circuit. The receiving circuit includes a first demodulator, a first analog to digital converter, a second demodulator, and a second analog to digital converter. The first demodulator is coupled to the touch electrode and demodulates a touch signal received from the touch electrode according to a first frequency to generate a first analog signal. The first analog to digital converter is coupled to the first demodulator and converts the first analog signal into a first digital signal. The second demodulator is coupled to the touch electrode and demodulates the touch signal according to a second frequency to generate a second analog signal. The second frequency is different from the first frequency. The second analog to digital converter is coupled to the second demodulator and converts the second analog signal into a second digital signal.

10 Claims, 6 Drawing Sheets

(56) References Cited

U.S. PATENT DOCUMENTS

| | | | |
|---|---|---|---|
| 2015/0130756 A1* | 5/2015 | Chang | G06F 3/0416 |
| | | | 345/174 |
| 2015/0177868 A1* | 6/2015 | Morein | G06F 3/044 |
| | | | 345/174 |
| 2016/0224155 A1* | 8/2016 | Kim | G02F 1/134327 |

* cited by examiner

ELECTRICAL DEVICE, RECEIVING CIRCUIT, AND METHOD FOR TOUCH SENSING

BACKGROUND

Field of Invention

The present invention relates to touch sensing. More particularly, the present invention relates to an electrical device, a receiving circuit, and a method capable of detecting multiple types of touch simultaneously.

Description of Related Art

In some electrical devices such as smart phones, tablets, laptops, etc., an active pen is provided with a touch screen for the user to write or draw. In some approaches, two touch electrodes are disposed in the electrical device in which one is for sensing a finger, and the other one is for sensing the active pen, but this configuration has relatively higher cost. If only one touch electrode is disposed, a receiving circuit may process a touch signal from the finger and a touch signal from the active pen in a time-division way, but this configuration may increase the response time. Therefore, how to provide good touch sensing performance while the touch electrode and the receiving circuit are shared is an issue concerned by the people in the art.

SUMMARY

Embodiments of the invention provide an electrical device including a touch electrode and a receiving circuit. The receiving circuit includes a first demodulator, a first analog to digital converter, a second demodulator, and a second analog to digital converter. The first demodulator is coupled to the touch electrode and demodulates a touch signal from the touch electrode according to a first frequency to generate a first analog signal. The first analog to digital converter is coupled to the first demodulator and converts the first analog signal into a first digital signal. The second demodulator is coupled to the touch electrode and demodulates the touch signal according to a second frequency to generate a second analog signal. The second frequency is different from the first frequency. The second analog to digital converter is coupled to the second demodulator and converts the second analog signal into a second digital signal.

In some embodiments, the first analog to digital converter has a first length of time for converting the first analog signal into a first digital signal. The second frequency is greater or less than the first frequency by at least a first frequency threshold which is a reciprocal of the first length of time.

In some embodiments, the second analog to digital converter has a second length of time for converting the second analog signal into a second digital signal. The first frequency is greater or less than the second frequency by at least a second frequency threshold which is a reciprocal of the second length of time.

In some embodiments, the electrical device further includes a first transmitting circuit and a second touch electrode. The second touch electrode is interlaced with the touch electrode. The first transmitting circuit is configured to transmit a signal having the first frequency to the second touch electrode, so as to induce the touch signal on the touch electrode.

In some embodiments, an active pen includes a second transmitting circuit for generating a signal having the second frequency.

In some embodiments, the electrical device further includes a receiving stage coupled between the touch electrode and the first demodulator and the second demodulator. The receiving stage includes an operational amplifier and a capacitor. The operational amplifier has a first input terminal coupled to the touch electrode, and a second input terminal receiving a programmable signal having the first frequency. The capacitor is coupled between the first input terminal and an output terminal of the operational amplifier.

In some embodiments, an amplitude of the programmable signal is progressively increasing and progressively decreasing. There is no switch disposed between the first input terminal and the touch electrode.

In some embodiments, the programmable signal has a triangle waveform.

From another aspect, embodiments of the invention provide the receiving circuit.

From another aspect, embodiments of the invention provide a method for an electrical device including a touch electrode. The method includes: demodulating, by a first demodulator, a touch signal from the touch electrode according to a first frequency to generate a first analog signal; converting, by a first analog to digital converter, the first analog signal into a first digital signal; demodulating, by a second demodulator, the touch signal according to a second frequency to generate second analog signal, in which the second frequency is different from the first frequency; and converting, by a second analog to digital converter, the second analog signal into a second digital signal.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence. In addition, the term "couple" used in the specification should be understood for electrically connecting two units directly or indirectly. In other words, when "a first object is coupled to a second object" is written in the specification, it means another object may be disposed between the first object and the second object.

Figure 1:
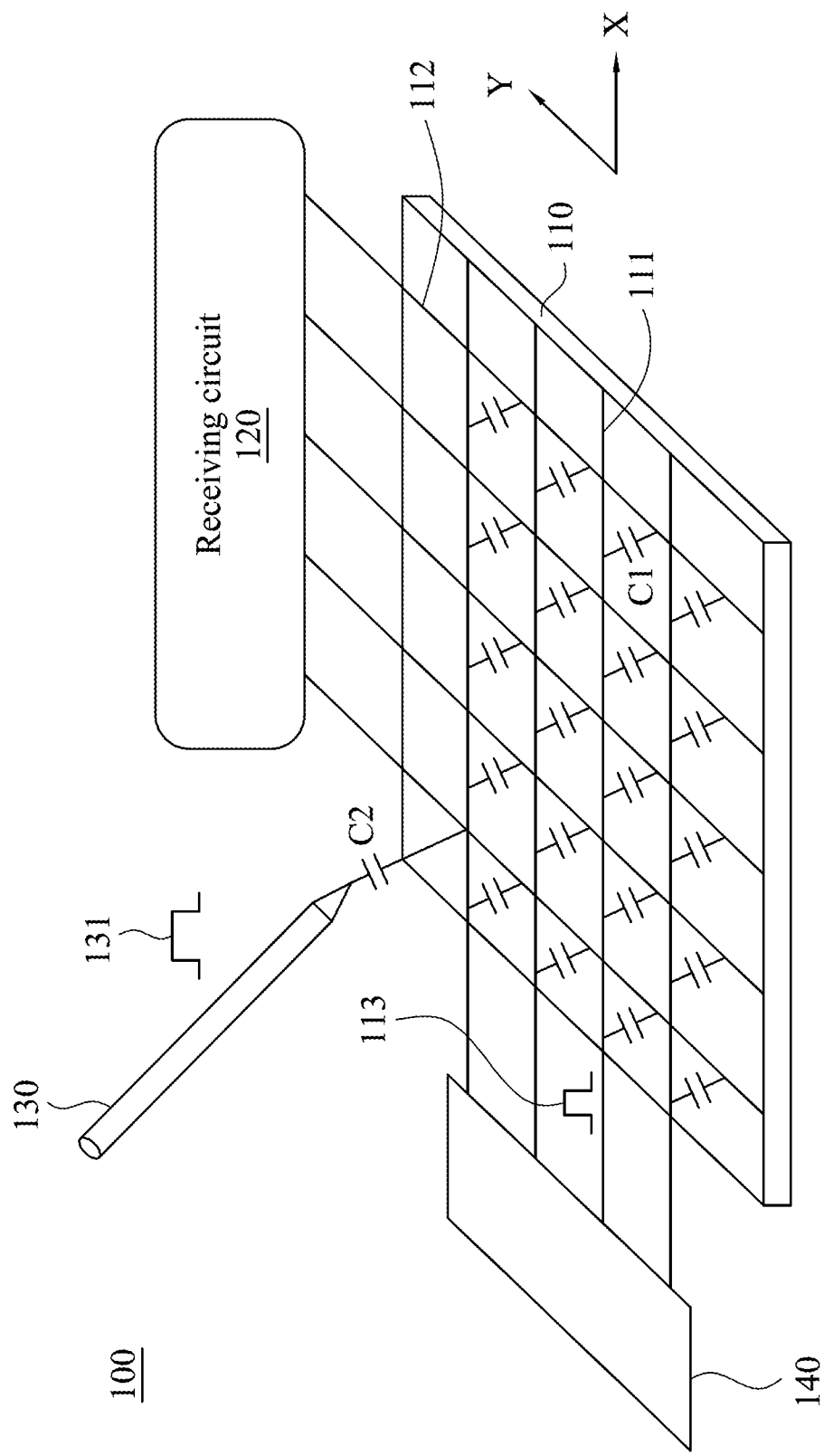
FIG. 1 is a schematic diagram of an electrical device with a mutual capacitance touch sensing in accordance with an embodiment.

FIG. 1 is a schematic diagram of an electrical device with a mutual capacitance touch sensing in accordance with an embodiment. Referring to FIG. 1, an electrical device 100 includes a display panel 110, a receiving circuit 120, an active pen 130, and a transmitting circuit 140 (also referred to as a first transmitting circuit). In some embodiments, the electrical device 100 may be a screen, a smart phone, a tablet, a personal computer, a laptop, an industrial computer or any forms of portable devices, which is not limited in the invention.

The display panel 110 includes touch electrodes (e.g. a touch electrode 111, also referred to as a second touch electrode) extending along the X direction and touch electrodes (e.g. a touch electrode 112, also referred to as a first touch electrode) extending along the Y direction. The touch electrode 111 is coupled to the transmitting circuit 140, and the touch electrode 112 is coupled to the receiving circuit 120. The material of the touch electrodes 111, 112 may include indium tin oxide (ITO), indium zinc oxide (IZO), antimony tin oxide (ATO), fluorine tin oxide (FTO) or other conductive and transparent material. The touch electrode 111 is electrically insulated from the touch electrode 112 so as to form a capacitor C1. The transmitting circuit 140 transmits a signal 113 to the touch electrode 111, and a touch signal is induced, by the capacitor C1, on the touch electrode 112 for the receiving circuit 120. When a finger touches a location of the display panel 110 where the touch electrode 111 is interlaced with the touch electrode 112, the capacitance of the capacitor C1 changes, so as the touch can be detected.

A capacitor C2 is formed between the active pen 130 and the display panel 110. The active pen 130 includes a transmitting circuit (also referred to as a second transmitting circuit) for generating a signal 131. The signal 131 induces, by the capacitor C2, a signal on the corresponding touch electrode for the receiving circuit 120. Accordingly, the receiving circuit 120 can sense where the active pen 130 is.

Figure 2:
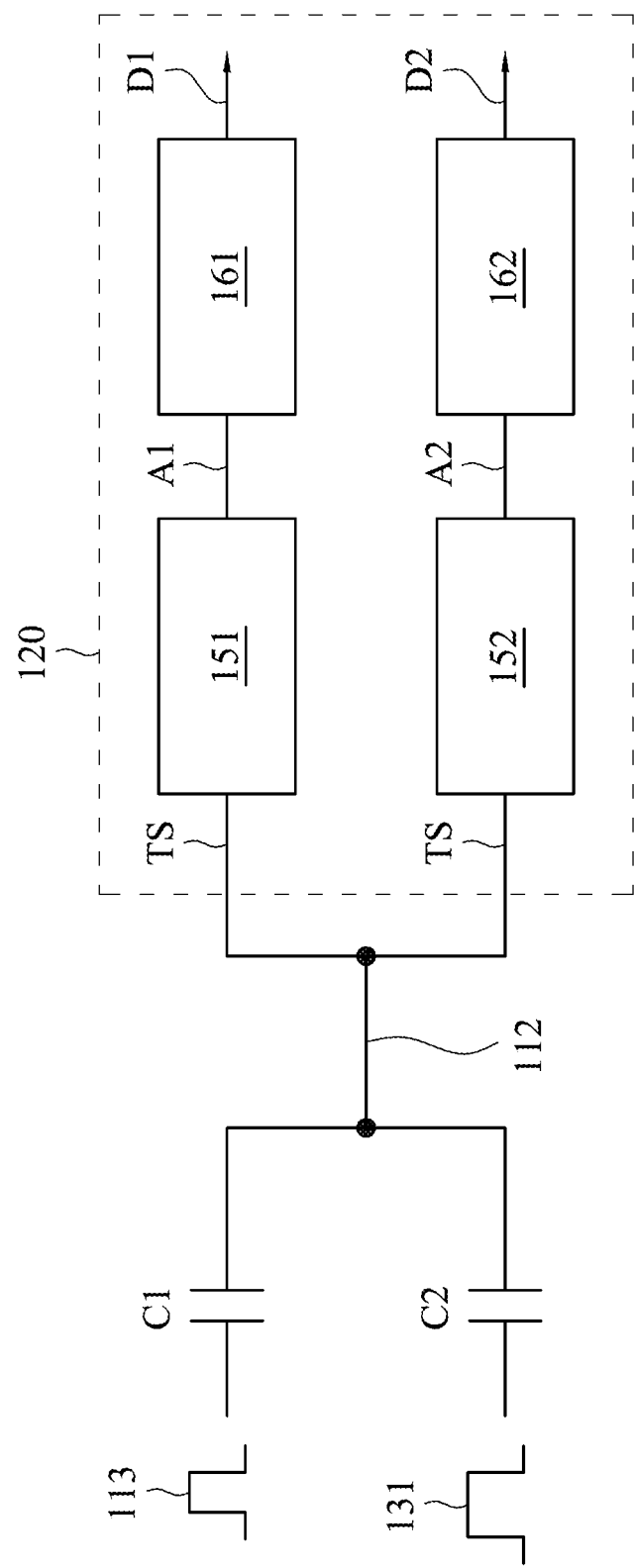
FIG. 2 is a circuit diagram of a receiving circuit in accordance with the embodiment of FIG. 1.

In the embodiment, the signals 113 and 131 have square waveforms, but the invention is not limited thereto. The signals 113 and 131 may have triangle waveforms or other waveforms in other embodiments. In particular, the frequency of the signal 113 is different from that of the signal 131. The receiving circuit 120 includes two demodulators operating at two different frequencies for processing the signal 113 and 131 respectively, and therefore the touch electrode and the receiving circuit 120 are shared. FIG. 2 is a circuit diagram of the receiving circuit in accordance with the embodiment of FIG. 1. Referring to FIG. 1 and FIG. 2, the touch electrode 112 is taken as an example. The receiving circuit 120 includes a first demodulator 151, a first analog to digital converter 161, a second demodulator 152 and a second analog to digital converter 162. The signal 113 has a first frequency, the signal 131 has a second frequency, and both of the two signals are transmitted to the touch electrode 112. The first demodulator 151 and the second demodulator 152 are both coupled to the touch electrode 112. The first demodulator 151 demodulates a touch signal TS received from touch electrode 112 according to the first frequency to generate a first analog signal A1. In other words, the first demodulator 151 serves as a band pass filter for extracting the signal 113 (i.e. the first analog signal A1) from the signal TS. The first analog to digital converter 161 is coupled to the first demodulator 151 and converts the first analog signal A1 into a first digital signal D1 which is generated in response to the capacitance of the capacitor C1 for detecting whether a corresponding location of the display panel 110 is touched. The second demodulator 152 demodulates the touch signal TS according to the second frequency to generate a second analog signal A2. Similarly, the second demodulator 152 serves as a band pass filter for extracting the signal 131 (i.e. the second analog signal A2) from the signal TS. The second analog to digital converter 162 is coupled to the second demodulator 152 and converts the second analog signal A2 into a second digital signal D2 which is generated in response to the capacitance of the capacitor C2 for detecting whether the active pen 130 touches the display panel 110 and/or the size of the stroke. In particular, the second frequency is different from the first frequency, and therefore the signal 113 and signal 131 do not interfere with the each other. For example, the first frequency may be 100 k Hz, and the second frequency may be 200 k Hz. However, the values of the first frequency and the second frequency are not limited in the invention. In some embodiments, the first frequency may be greater than the second frequency.

In some embodiments, the absolute difference between the first frequency and the second frequency is larger than a frequency threshold. The frequency threshold is inversely proportional to converting time of the analog to digital converters 161 and 162. For example, if the second frequency is 200 k Hz, then one cycle is 5 micro seconds. If the analog to digital converter 162 needs 20 cycles to convert the second analog signal A2 into the second digital signal D2, then the converting time of the analog to digital converter 162 is 20*5=100 micro seconds (also referred to as a second length of time). The reciprocal of the 100 micro seconds is 10 k Hz. It means that the first frequency has to be greater or less than the first frequency by at least 10 k Hz. Similarly, for the case that the first frequency is 100 k Hz, one cycle is 10 micro seconds. If the analog to digital converter 161 needs 20 cycles to convert the first analog signal A1 into the first digital signal D1, then the converting time of the analog to digital converter 161 is 20*10=200 micro seconds (also referred to as a first length of time). The reciprocal of the 200 micro seconds is 5 k Hz. It means that the second frequency has to be greater or less than the first frequency by at least 5 k Hz. In other words, when the first analog to digital converter 161 has a first length of time for converting the first analog signal A1 into a first digital signal D1, the second frequency is greater or less than the first frequency by at least a first frequency threshold which is a reciprocal of the first length of time. When the second analog to digital converter 162 has a second length of time for converting the second analog signal A2 into a second digital signal D2, the first frequency is greater or less than the second frequency by at least a second frequency threshold which is a reciprocal of the second length of time.

Figure 3:
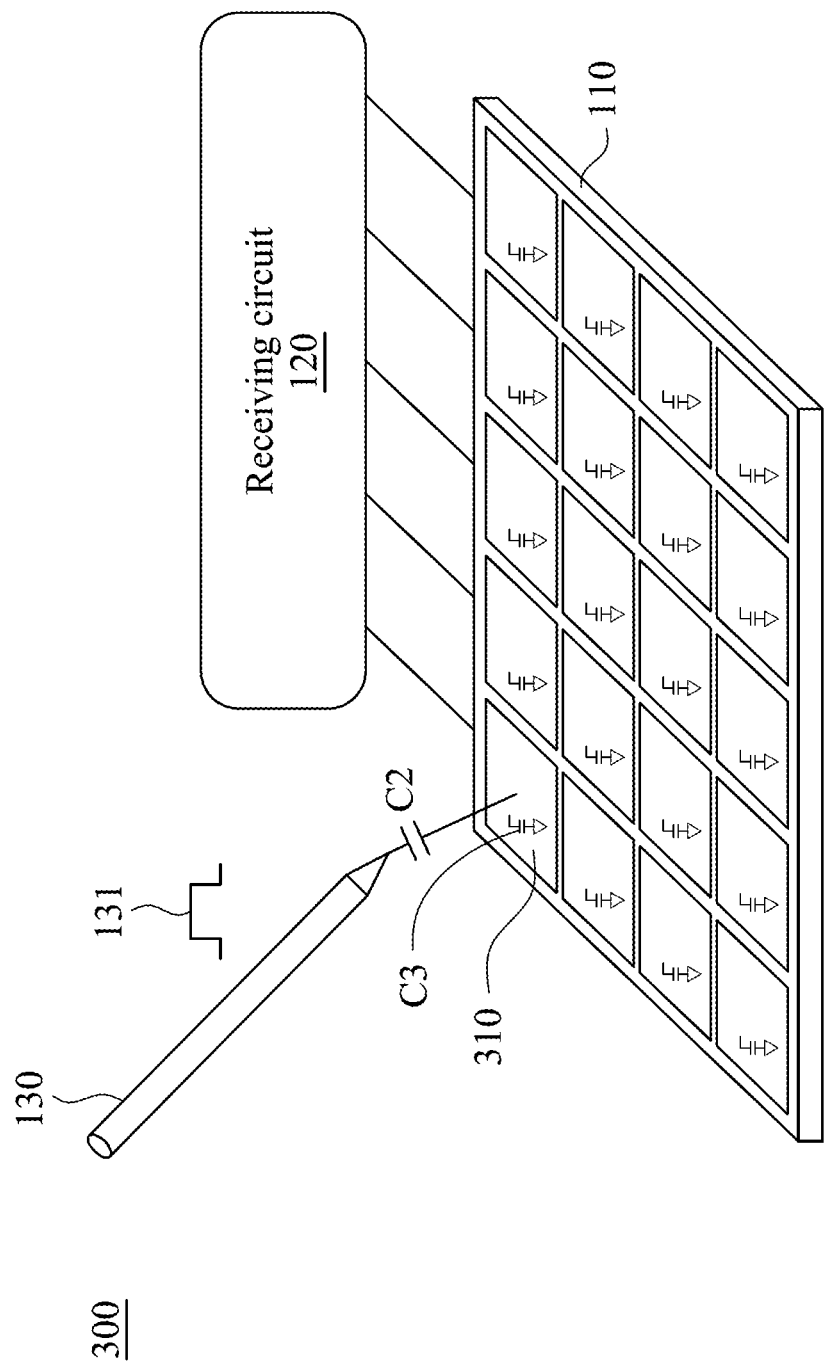
FIG. 3 is a schematic diagram of an electrical device with a self-capacitance touch sensing in accordance with an embodiment.

FIG. 3 is a schematic diagram of an electrical device with a self-capacitance touch sensing in accordance with an embodiment. In an electrical device 300, the display panel 110 includes touch electrode (e.g. a touch electrode 310) arranged as a matrix. However, the arrangement of the touch electrodes in the display panel 110 is not limited in the invention. Each touch electrode is coupled to the receiving circuit 120 through a conducting line. The touch electrodes and a substrate constitute capacitors (e.g. a capacitor C3). When a finger touches the display panel 110 where the touch electrode 310 locates, the capacitance of the capacitor C3 changes. Accordingly, whether a corresponding location is touched by the finger is determined by sensing the capacitance of the capacitor C3. The active pen 130 and the capacitor C2 have been described above, and therefore the description will not be repeated.

Figure 4:
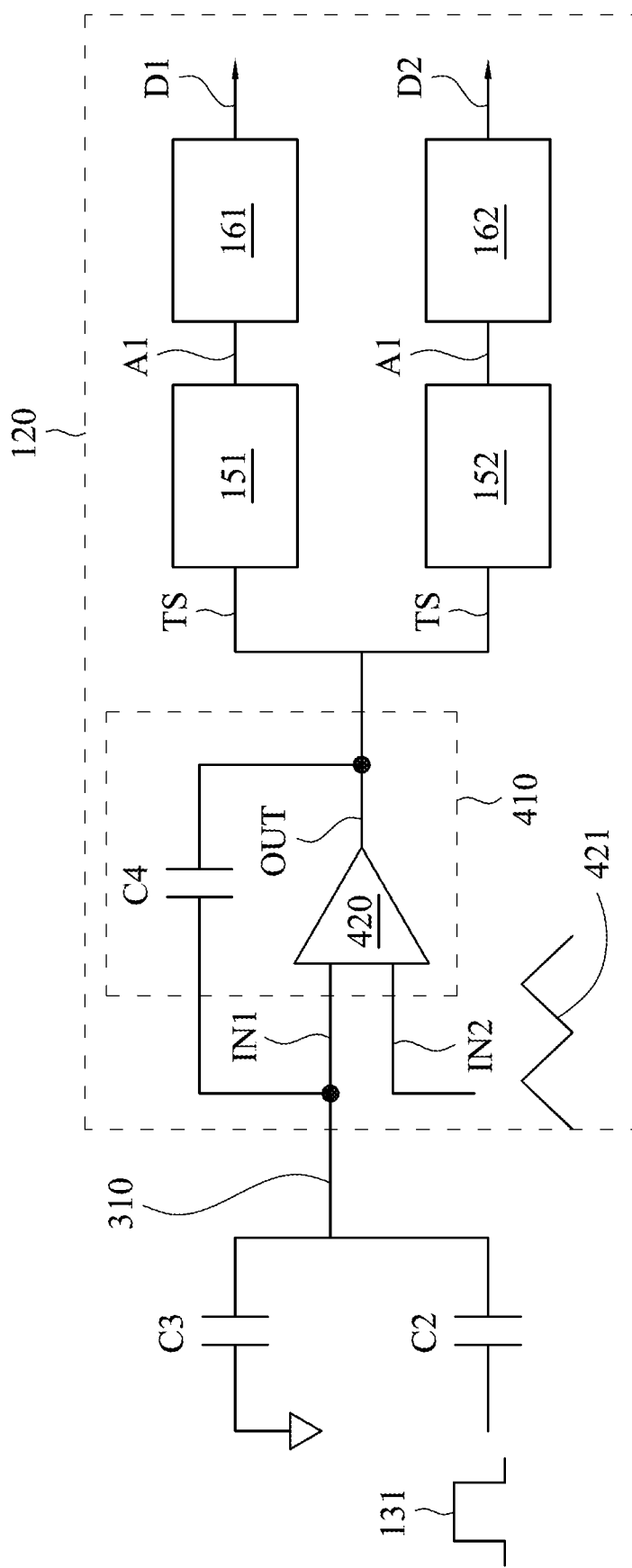
FIG. 4 is a circuit diagram of a receiving circuit in accordance with the embodiment of FIG. 3.

FIG. 4 is a circuit diagram of a receiving circuit in accordance with the embodiment of FIG. 3. Referring to FIG. 3 and FIG. 4, the touch electrode 310 is taken as an example. The difference between FIG. 4 and FIG. 2 is that, in FIG. 4, the receiving circuit 120 further includes a receiving stage 410 coupled between the touch electrode 310 and the first demodulator 151 and the second demodulator 152. The receiving stage 410 includes an operational amplifier 420 and a capacitor C4. The operational amplifier 420 has a first input terminal IN1 coupled to the touch electrode 310, and a second input terminal IN2 receiving a programmable signal 421 having the first frequency. The capacitor C4 is coupled between the first input terminal IN1 and an output terminal OUT of the operational amplifier 420. Because the two input terminals IN1 and IN2 of the operational amplifier 420 are virtual-shorted, the programmable signal 421 is transmitted to the capacitor C3 through the first input terminal IN1. The capacitor C4 and the operational amplifier 420 are also used to sum the signals from the capacitor C3 and the capacitor C2 as the touch signal TS. The operations of the first demodulator 151, the first analog to digital converter 161, the second demodulator 152 and the second analog to digital converter 162 have been described above, and therefore they will not be described again. In the embodiment, the frequency of the programmable signal 421 is different from that of the signal 131, and therefore the two signals do not interfere with the each other. Accordingly, the touches caused by the finger and the active pen are detected simultaneously.

Note that the amplitude of the programmable signal 421 is progressively increasing and progressively decreasing. For example, the programmable signal 421 has a triangle waveform (not square waveform). Accordingly, the capacitor C4 will not be charged/discharged rapidly, and thus the bandwidth requirement of the operational amplifier 420 is reduced. On the other hand, there is no switch disposed between the first input terminal IN1 and the touch electrode 310. In the embodiment, the capacitor C3 is not charged through switches, and thus the noises on the touch electrode 310 will not be folded into the main frequency band.

The touch electrodes 112 and 310 are disposed in the display panel 110 in the aforementioned embodiments. However, the touch electrodes 112 and 310 may be disposed in a touch module disposed outside the display panel 110. The disposition location of the touch electrodes 112 and 310 is not limited in the invention.

Figure 5:
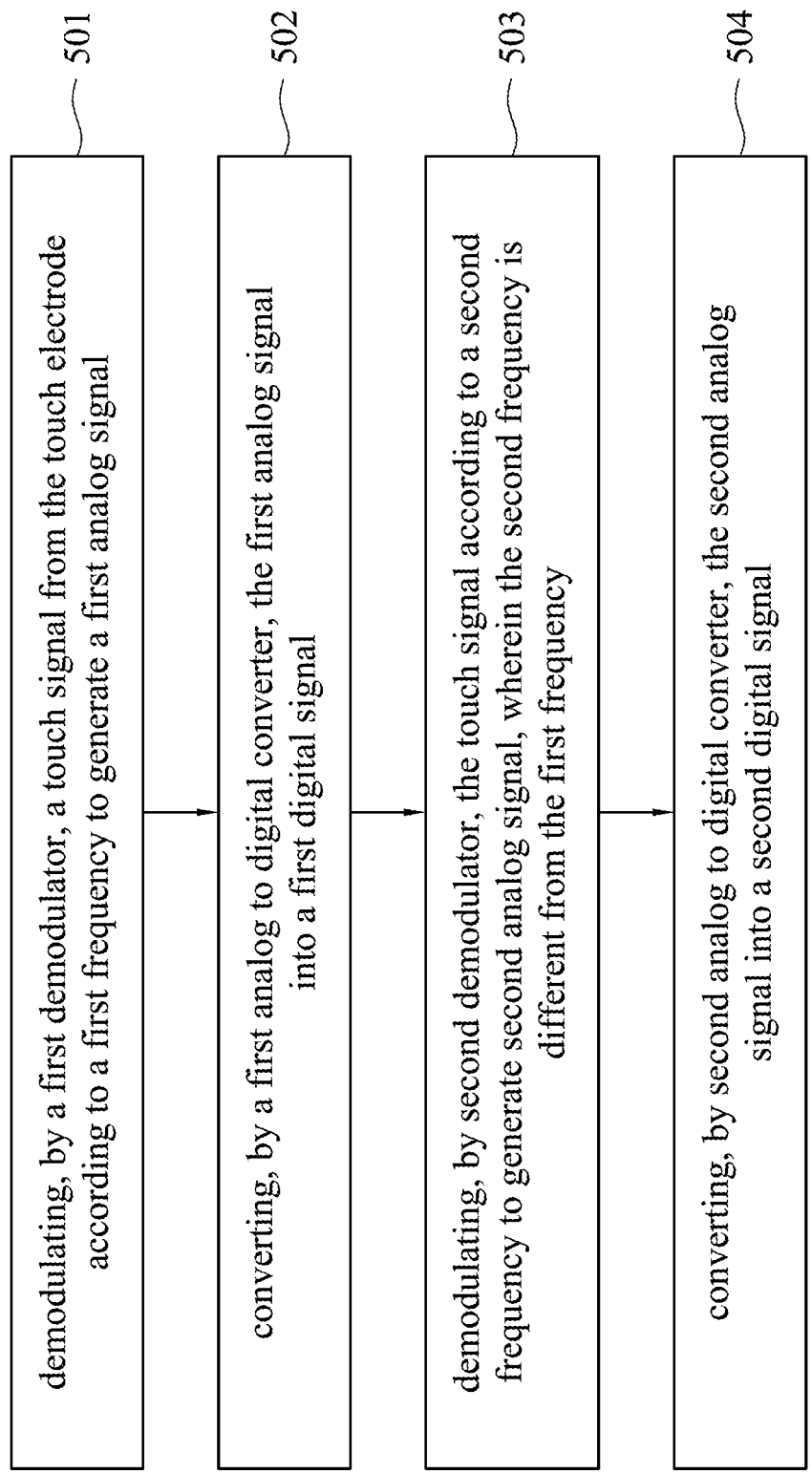
FIG. 5 is a diagram illustrating a flow chart of a method for processing a touch signal in accordance with an embodiment.

FIG. 5 is a diagram illustrating a flow chart of a method for processing a touch signal in accordance with an embodiment. The method of FIG. 5 may be applied to the electrical device of FIG. 1 or FIG. 3. In step 501, a touch signal received from a touch electrode is demodulated by a first demodulator according to a first frequency to generate a first analog signal. In step 502, the first analog signal is converted into a first digital signal by a first analog to digital converter. In step 503, the touch signal is demodulated by a second demodulator according to a second frequency to generate a second analog signal. The second frequency is different from the first frequency. In step 504, the second analog signal is converted into a second digital signal by a second analog to digital converter. However, each step of FIG. 5 has been described in detail above, and therefore the description will not be repeated. Note that the steps of FIG. 5 can be implemented as one or more circuits which could be disposed in any electrical device. In addition, other steps may be inserted into the steps of FIG. 5.

Figure 6:
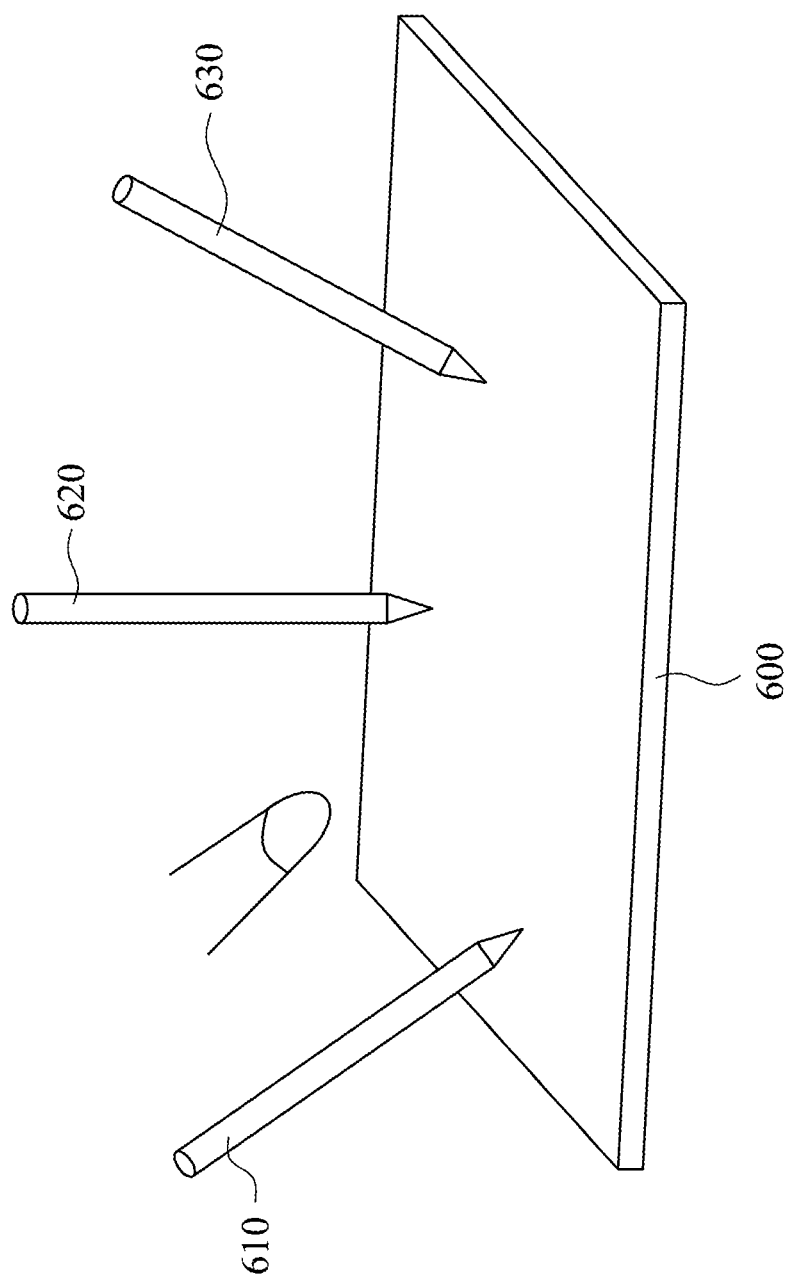
FIG. 6 is a schematic diagram of an electrical device while multiple active pens are disposed in accordance with an embodiment.

The electrical device in the aforementioned embodiments can detect the finger and the active pen 130 simultaneously. The disclosure may also be applied to an electrical device having more active pens. FIG. 6 is a schematic diagram of an electrical device while multiple active pens are disposed in accordance with an embodiment. Referring to FIG. 6, an electrical device 600 operates with active pens 610, 620, and 630, and the electrical device 600 can also detect the finger touch. To be specific, the receiving circuit in the electrical device 600 has four demodulators operating at different frequencies. All the demodulators receive a touch signal from the same touch electrode. One of the demodulators is used for sensing the finger touch, and the other three demodulators are used for sensing the active pens 610, 620 and 630 respectively. How many active pens are disposed with the electrical device 600 is not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. An electrical device comprising:
a touch electrode; and
a receiving circuit comprising:
   a first demodulator, coupled to the touch electrode and demodulating a touch signal received from the touch electrode according to a first frequency to generate a first analog signal;
   a first analog to digital converter, coupled to the first demodulator and converting the first analog signal into a first digital signal;
   a second demodulator, coupled to the touch electrode and demodulating the touch signal according to a second frequency to generate a second analog signal, wherein the second frequency is different from the first frequency; and
   a second analog to digital converter, coupled to the second demodulator and converting the second analog signal into a second digital signal,
wherein the first analog to digital converter needs a first number of first cycles, where each of the first cycles is a reciprocal of the first frequency, for converting the first analog signal into a first digital signal, and the second frequency is greater or less than the first frequency by at least a first frequency threshold which is a reciprocal of a sum of the first cycles,
wherein the second analog to digital converter needs a second number of second cycles, where each of the second cycles is a reciprocal of the second frequency, for converting the second analog signal into a second digital signal, the first frequency is greater or less than the second frequency by at least a second frequency threshold which is a reciprocal of a sum of the second cycles;
wherein the electrical device further comprises a receiving stage coupled between the touch electrode and the first demodulator and the second demodulator, wherein the receiving stage comprises:
an operational amplifier having a first input terminal coupled to the touch electrode, and a second input terminal receiving a programmable signal having the first frequency; and
a capacitor coupled between the first input terminal and an output terminal of the operational amplifier.

2. The electrical device of claim 1, further comprising a first transmitting circuit and a second touch electrode, wherein the second touch electrode is interlaced with the touch electrode,
the first transmitting circuit is configured to transmit a signal having the first frequency to the second touch electrode, so as to induce the touch signal on the touch electrode.

3. The electrical device of claim 2, further comprising an active pen comprising a second transmitting circuit for generating a signal having the second frequency.

4. The electrical device of claim 1, further comprising an active pen comprising a second transmitting circuit for generating a signal having the second frequency.

5. The electrical device of claim 1, wherein an amplitude of the programmable signal is progressively increasing and progressively decreasing, and there is no switch disposed between the first input terminal and the touch electrode.

6. The electrical device of claim 5, wherein the programmable signal has a triangle waveform.

7. A receiving circuit disposed in an electrical device comprising a touch electrode, wherein the receiving circuit comprises:
a first demodulator coupled to the touch electrode and demodulating a touch signal received from the touch electrode according to a first frequency to generate a first analog signal;
a first analog to digital converter coupled to the first demodulator and converting the first analog signal into a first digital signal;
a second demodulator coupled to the touch electrode and demodulating the touch signal according to a second frequency to generate a second analog signal, wherein the second frequency is different from the first frequency; and
a second analog to digital converter coupled to the second demodulator and converting the second analog signal into a second digital signal,
wherein the first analog to digital converter needs a first number of first cycles, where each of the first cycles is a reciprocal of the first frequency, for converting the first analog signal into a first digital signal, and the second frequency is greater or less than the first frequency by at least a first frequency threshold which is a reciprocal of a sum of the first cycles,
wherein the second analog to digital converter needs a second number of second cycles, where each of the second cycles is a reciprocal of the second frequency, for converting the second analog signal into a second digital signal, the first frequency is greater or less than the second frequency by at least a second frequency threshold which is a reciprocal of a sum of the second cycles;
wherein the receiving circuit further comprises a receiving stage coupled between the touch electrode and the first demodulator and the second demodulator, wherein the receiving stage comprises:
an operational amplifier having a first input terminal coupled to the touch electrode, and a second input terminal receiving a programmable signal having the first frequency; and
a capacitor coupled between the first input terminal and an output terminal of the operational amplifier.

8. The receiving circuit of claim 7, wherein an amplitude of the programmable signal is progressively increasing and progressively decreasing, and there is no switch disposed between the first input terminal and the touch electrode.

9. The receiving circuit of claim 8, wherein the programmable signal has a triangle waveform.

10. A method for an electrical device comprising a touch electrode, wherein the method comprises:
demodulating, by a first demodulator, a touch signal received from the touch electrode according to a first frequency to generate a first analog signal;
converting, by a first analog to digital converter, the first analog signal into a first digital signal;
demodulating, by a second demodulator, the touch signal according to a second frequency to generate a second analog signal, wherein the second frequency is different from the first frequency; and
converting, by a second analog to digital converter, the second analog signal into a second digital signal,
wherein the first analog to digital converter needs a first number of first cycles, where each of the first cycles is a reciprocal of the first frequency, for converting the first analog signal into a first digital signal, and the second frequency is greater or less than the first frequency by at least a first frequency threshold which is a reciprocal of a sum of the first cycles,
wherein the second analog to digital converter needs a second number of second cycles, where each of the second cycles is a reciprocal of the second frequency, for converting the second analog signal into a second digital signal, the first frequency is greater or less than the second frequency by at least a second frequency threshold which is a reciprocal of a sum of the second cycles;
wherein the electrical device further comprises a receiving stage coupled between the touch electrode and the first demodulator and the second demodulator, wherein the receiving stage comprises:
an operational amplifier having a first input terminal coupled to the touch electrode, and a second input terminal receiving a programmable signal having the first frequency; and
a capacitor coupled between the first input terminal and an output terminal of the operational amplifier.

* * * * *